US012726803B2

(12) United States Patent
Khullar et al.

(10) Patent No.: US 12,726,803 B2
(45) Date of Patent: Sep. 1, 2026

(54) KEY FOB AND METHOD OF CONFIGURING A KEY FOB

(71) Applicant: NXP B.V., Eindhoven (NL)

(72) Inventors: Naman Khullar, Graz (AT); Dorian Haslinger, Graz (AT); Marc Manninger, Graz (AT)

(73) Assignee: NXP B.V., Eindhoven (NL)

( * ) Notice: Subject to any disclaimer, the term of this patent is extended or adjusted under 35 U.S.C. 154(b) by 17 days.

(21) Appl. No.: 18/808,475

(22) Filed: Aug. 19, 2024

(65) Prior Publication Data

US 2025/0080964 A1 Mar. 6, 2025

(30) Foreign Application Priority Data

Aug. 31, 2023 (EP) .................................... 23194572

(51) Int. Cl.

*H04W 4/80* (2018.01)
*B60R 25/24* (2013.01)
*H02J 50/10* (2016.01)
*H04W 12/47* (2021.01)

(52) U.S. Cl.

CPC ............... *H04W 4/80* (2018.02); *H02J 50/10* (2016.02); *B60R 25/24* (2013.01); *B60R 2325/101* (2013.01); *B60R 2325/103* (2013.01)

(58) Field of Classification Search

CPC ....................................................... H04W 4/80

See application file for complete search history.

(56) References Cited

U.S. PATENT DOCUMENTS 9,553,479 B2 1/2017 Lee et al.
10,035,494 B2 7/2018 Sute
2003/0231550 A1* 12/2003 Macfarlane ........... B60R 25/257 340/5.72
2011/0115605 A1* 5/2011 Dimig .................. H02J 50/402 340/5.61
2014/0062655 A1* 3/2014 Colburn ............ G07C 9/00182 340/5.61
2014/0073308 A1* 3/2014 Kim ...................... H04W 4/046 455/418
2014/0313009 A1* 10/2014 King ...................... G08C 17/02 340/5.61
2016/0118839 A1* 4/2016 Lee ......................... H02J 50/80 320/108
2016/0300417 A1* 10/2016 Hatton ............... G07C 9/00857
2021/0136550 A1 5/2021 Schwartz et al.
2021/0241552 A1* 8/2021 Jonely ................ G07C 9/00944
2024/0067125 A1* 2/2024 Robertson ............... B60R 25/01

FOREIGN PATENT DOCUMENTS

DE 102015211026 A1 12/2016
GB 2496847 A * 5/2013 ......... G07C 9/00309
WO WO-2015174736 A1 11/2015

* cited by examiner

*Primary Examiner* — Davetta W Goins
*Assistant Examiner* — Pameshanand Mahase

(57) ABSTRACT

A device such as a key fob includes a wireless interface for establishing a wireless connection to a controller integrated in a vehicle. The key fob is configured provide access credentials to the controller via the wireless connection. The key fob also includes a wired interface for connecting the key fob to a console integrated in the vehicle. When connected to the console, the key fob can be used to wirelessly charge an external mobile device. In addition, or in the alternative, the key fob can be used as an anchor device for performing ranging operations with an external mobile device.

14 Claims, 3 Drawing Sheets

KEY FOB AND METHOD OF CONFIGURING A KEY FOB

CROSS-REFERENCE TO RELATED APPLICATIONS

This application claims the priority under 35 U.S.C. § 119 of European patent application no. 23194572.6, filed Aug. 31, 2023, the contents of which are incorporated by reference herein.

TECHNICAL FIELD

The present disclosure relates to a key fob. Furthermore, the present disclosure relates to a corresponding method of configuring a key fob.

BACKGROUND

Smart key fobs are commonly used as portable devices for accessing a vehicle and its functions. Smart key fob are typically equipped with a secure element (SE), a passive near field communication (NFC) unit, a Bluetooth low energy (BLE) communication unit and an ultra-wideband (UWB) communication unit.

SUMMARY

In accordance with a first aspect of the present disclosure, a key fob is provided, comprising: a wireless interface for establishing a wireless connection to a controller integrated in a vehicle, wherein the wireless connection enables the key fob to provide access credentials to said controller; a wired interface for connecting the key fob to a console integrated in the vehicle, such that the key fob is usable for carrying out wireless charging of an external mobile device and/or for acting as an anchor device for performing ranging operations with said external mobile device.

In one or more embodiments, the key fob further comprises a power transmitter configured to be connected, through the wired interface, to one or more antennas integrated in the vehicle, and to carry out the wireless charging through said antennas.

In one or more embodiments, the key fob further comprises a power receiver configured to receive power from an external charging device and to transfer said power to one or more components of the key fob.

In one or more embodiments, the key fob further comprises a near field communication (NFC) unit, wherein the NFC unit is configured to act as a proximity coupling device for establishing an NFC channel with the mobile device.

In one or more embodiments, the NFC unit further comprises a secure element for storing one or more of the following applets: a key fob applet, a wireless charging applet, an authentication applet, a payment applet.

In one or more embodiments, the key fob further comprises an ultra-wideband (UWB) communication unit for performing said ranging operations with the mobile device.

In one or more embodiments, the wireless interface is a Bluetooth low energy (BLE) communication unit.

In one or more embodiments, the wireless charging of the mobile device comprises Qi-based wireless charging operations.

In accordance with a second aspect of the present disclosure, a method of configuring a key fob is conceived, comprising: providing the key fob with a wireless interface for establishing a wireless connection to a controller integrated in a vehicle, wherein the wireless connection enables the key fob to provide access credentials to said controller; providing the key fob with a wired interface for connecting the key fob to a console integrated in the vehicle, such that the key fob is usable for carrying out wireless charging of an external mobile device and/or for acting as an anchor device for performing ranging operations with said external mobile device.

In one or more embodiments, the method further comprises providing the key fob with a power transmitter configured to be connected, through the wired interface, to one or more antennas integrated in the vehicle, and to carry out the wireless charging through said antennas.

In one or more embodiments, the method further comprises providing the key fob with a power receiver configured to receive power from an external charging device and to transfer said power to one or more components of the key fob.

In one or more embodiments, the method further comprises providing the key fob with a near field communication (NFC) unit, wherein the NFC unit is configured to act as a proximity coupling device for establishing an NFC channel with the mobile device.

In one or more embodiments, the NFC unit further comprises a secure element for storing one or more of the following applets: a key fob applet, a wireless charging applet, an authentication applet, a payment applet.

In one or more embodiments, the method further comprises providing the key fob with an ultra-wideband (UWB) communication unit for performing said ranging operations with the mobile device.

In one or more embodiments, the wireless interface is a Bluetooth low energy (BLE) communication unit.

DESCRIPTION OF DRAWINGS

Embodiments will be described in more detail with reference to the appended drawings.

DESCRIPTION OF EMBODIMENTS

As mentioned above, smart key fob are typically equipped with a secure element (SE), a passive near field communication (NFC) unit, a Bluetooth low energy (BLE) communication unit and an ultra-wideband (UWB) communication unit. A secure element may be defined as a tamper-resistant integrated circuit with installed applications, which have a prescribed functionality and a prescribed level of security. Furthermore, a secure element may implement security functions, such as cryptographic functions and authentication functions. The secure element may contain credentials for accessing a vehicle, for example a car. Each communication and security protocol which is carried out by the smart key fob is power hungry and it is difficult to operate the key fob for a long time using a single power source or cycle. A key fob needs to be charged quite often and it is an extra device which should be maintained in addition to devices such as cell phones and access cards. For charging the energy-hungry key fob or phones, the vehicle also typically supports a separate secure wireless charging module (with a high power charging capability), which contributes to a higher bill of material (BOM) cost for the central console of the vehicle.

Figure 1:
FIG. 1 shows an example of a vehicle access system.
Figure 1:
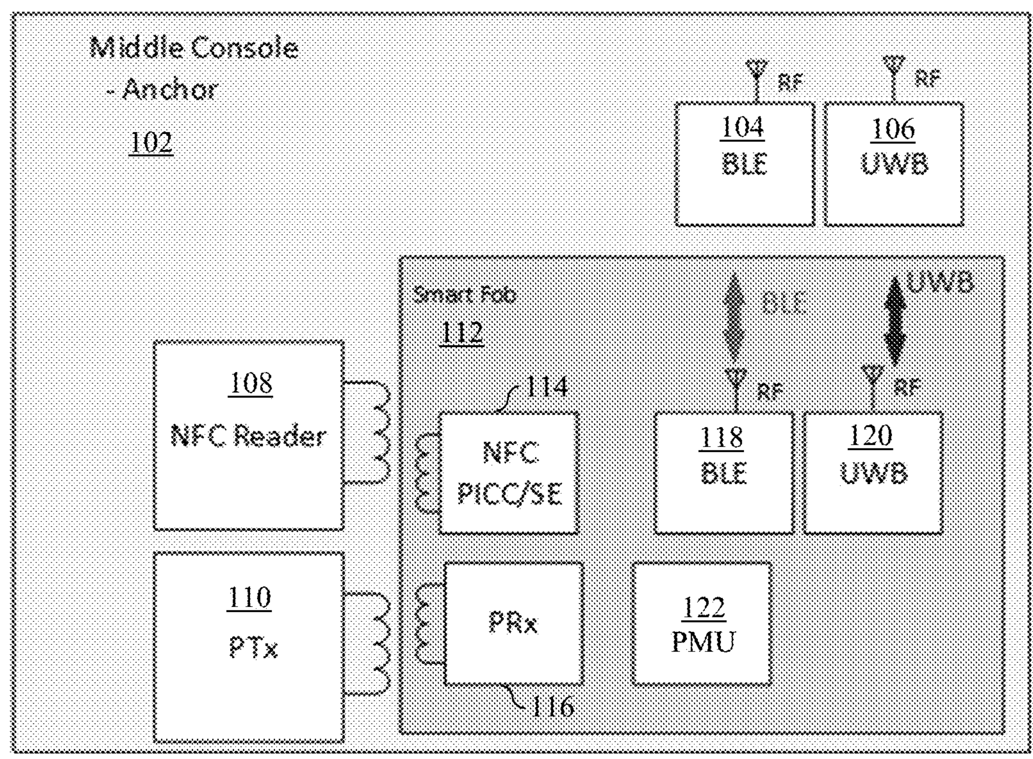

FIG. 1 shows an example of a vehicle access system 100. The system 100 includes a middle console 102, mounted in a vehicle. The middle console 102 also functions as an anchor for localizing access devices. An example of such an access device is the smart fob 112. This smart fob 112, which is included in the system 100, provides access credentials to the middle console 102, in order to unlock the vehicle and gain access to its functions, for example. For this purpose, both the middle console 102 and the smart fob 112 contain a BLE communication unit 104, 118. In addition, both the middle console 102 and the smart fob 112 contain a UWB communication unit 106, 120, by means of which ranging operations can be performed between the middle console 102 and the smart fob 112. These ranging operations may be used to enhance the security of the access procedure, in the sense that it can be checked whether the smart fob 112 meets the requirement of having a predefined range to the vehicle. Furthermore, the middle console 102 is able to provide energy to the smart fob 112, such that the latter can be charged by the middle console 102. For this purpose, the smart fob 112 contains a power receiver 116, and the middle console 102 contains a power transmitter 110. To initiate the charging process and ensure that only authentic key fobs are charged, for example, NFC communication may be established between the middle anchor 102 and the smart fob 112. For this purpose, the middle console 102 contains an NFC reader 108 (i.e., a so-called proximity coupling device or "PCD"), and the smart fob 112 contains a passive NFC device 114 (i.e., a so-called proximity integrated circuit card or "PICC"). To store data and applets that should be protected, the passive NFC device 114 also contains a secure element. As mentioned above, a middle console 102 of the kind shown in FIG. 1 has a relatively high BOM cost.

Now discussed are a key fob and a corresponding method of configuring a key fob, which facilitate reducing the BOM cost of a vehicle, in particular by facilitating reducing the complexity of a console of the kind set forth above. The key fob may be used in a car or in another kind of vehicle.

Figure 2:
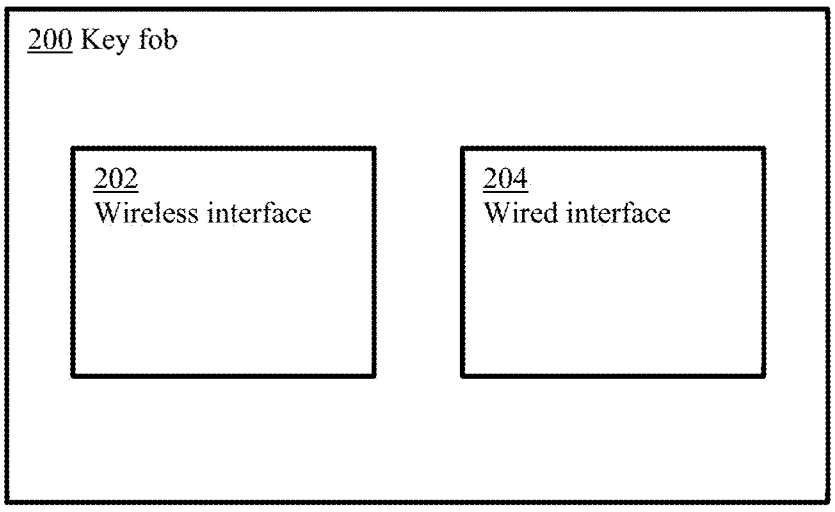
FIG. 2 shows an illustrative embodiment of a key fob.

FIG. 2 shows an illustrative embodiment of a key fob 200. The key fob 200 comprises a wireless interface 202 and a wired interface 204. The wireless interface 202 is configured to establish a wireless connection to a controller integrated in a vehicle (not shown), wherein the wireless connection enables the key fob 200 to provide access credentials to said controller. Furthermore, the wired interface 204 is configured to be used for connecting the key fob 200 to a console integrated in the vehicle, such that the key fob 200 is usable for carrying out wireless charging of an external mobile device (not shown) and/or for acting as an anchor device for performing ranging operations with said external mobile device. By providing the key fob 200 with a wired interface 204 that can enable the key fob 200 to carry out wireless charging and/or to act as an anchor device for performing ranging operations, less components for supporting such functions need to be implemented in the console of the vehicle. Accordingly, the key fob 200 facilitates reducing the BOM cost of the vehicle.

In one or more embodiments, the key fob further comprises a power transmitter configured to be connected, through the wired interface, to one or more antennas integrated in the vehicle, and to carry out the wireless charging through said antennas. In this way, the wireless charging is facilitated, while saving space in the key fob since the antennas used for the charging process are included in the vehicle, and not in the key fob. In one or more embodiments, the key fob further comprises a power receiver configured to receive power from an external charging device and to transfer said power to one or more components of the key fob. In this way, the key fob itself may easily be charged, for example by a dedicated charger device.

In one or more embodiments, the key fob further comprises an NFC unit, wherein the NFC unit is configured to act as a proximity coupling device for establishing an NFC channel with the mobile device. In this way, various applications may be enabled, such as initiating or controlling a wireless charging process between the key fob and the external device, and exchanging UWB credentials between the key fob and the external device. In a practical implementation, the NFC unit further comprises a secure element for storing one or more of the following applets: a key fob applet, a wireless charging applet, an authentication applet, a payment applet. In this way, various secure applications may be enabled.

In one or more embodiments, the key fob further comprises an ultra-wideband (UWB) communication unit for performing said ranging operations with the mobile device. The UWB communication unit facilitates estimating the distance between the key fob and the vehicle, such that the access to the vehicle may be controlled in a more secure manner. Furthermore, in one or more embodiments, the wireless interface is a BLE communication unit. In this way, access credentials may be provided to the controller of a vehicle at low power consumption. In a practical implementation, the wireless charging of the mobile device comprises Qi-based wireless charging operations.

Figure 3:
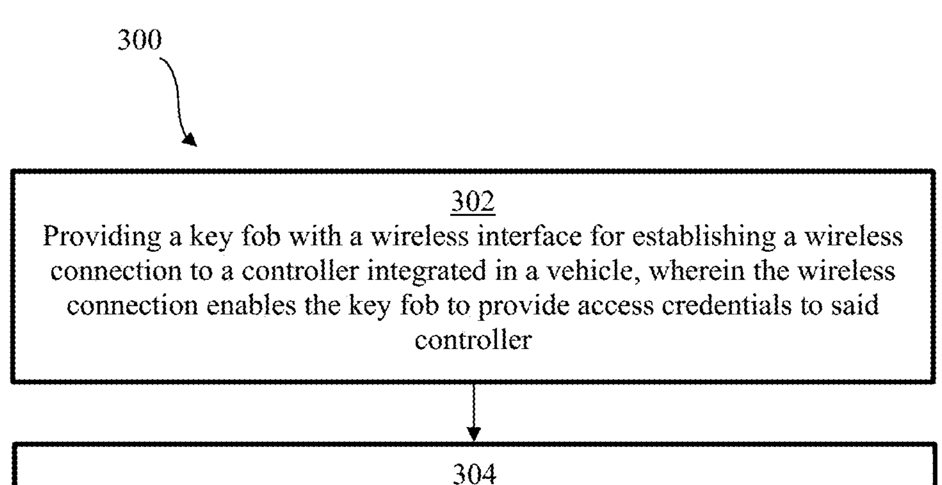
FIG. 3 shows an illustrative embodiment of a method of configuring a key fob.

FIG. 3 shows an illustrative embodiment of a method 300 of configuring a key fob. The method 300 comprises the following steps. At 302, the key fob is provided with a wireless interface for establishing a wireless connection to a controller integrated in a vehicle, wherein the wireless connection enables the key fob to provide access credentials to said controller. Furthermore, at 304, the key fob is provided with a wired interface for connecting the key fob to a console integrated in the vehicle, such that the key fob is usable for carrying out wireless charging of an external mobile device and/or for acting as an anchor device for performing ranging operations with said external mobile device. As mentioned above, by providing the key fob with a wired interface that can enable the key fob to carry out wireless charging and/or to act as an anchor device for performing ranging operations, less components for supporting such functions need to be implemented in the console of the vehicle. Accordingly, the method 300 facilitates reducing the BOM cost of the vehicle.

Figure 4:
FIG. 4 shows an illustrative embodiment of a vehicle access system.
Figure 4:
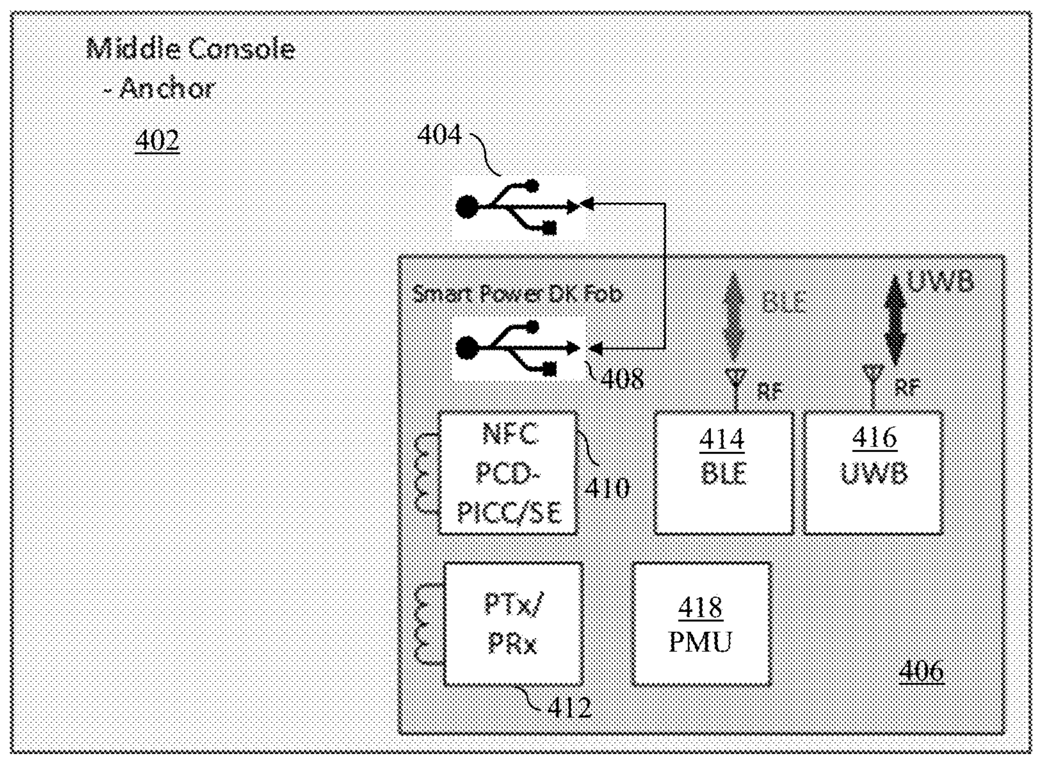

FIG. 4 shows an illustrative embodiment of a vehicle access system 400. The system 400 includes a middle console 402, mounted in a vehicle. In accordance with the present disclosure, a smart power digital key fob 406 may be coupled to the middle console 402. One difference with the key fob shown in FIG. 1 is that the smart power digital key fob 406 contains an NFC unit 410 which can also function as a proximity coupling device (PCD). Furthermore, the smart power digital key fob 406 contains a combined power transmitter/receiver 412. In addition, the smart power digital key fob 406 contains a wired interface 408 which can be coupled to a corresponding wired interface (e.g., a USB-C interface) in the middle console 402. Thus, the key fob 400 is enabled to carry out wireless charging and/or to act as an anchor device for performing ranging operations, for example with a digital key (DK) enabled smart phone. Consequently, less components need to be integrated into the middle console 402. More specifically, the smart power digital key fob 406 may carry out the wireless charging operations and/or ranging operations that would otherwise be performed by the middle console 402. Furthermore, since the smart power digital key fob 406 contains a BLE communication unit 414, it may also receive access credentials from an external device (e.g., a mobile phone) instead of the middle console 402. Thus, the middle console 402 does not need to be equipped with the components shown in FIG. 1.

A smart power digital key fob of the kind set forth may have a relatively high level of security, by integrating a secure element into its NFC unit. Furthermore, it may be a portable device which can act as power transmitter (PTx) as well as a power receiver (PRx) to support secure high-power charging (e.g., 15 W charging). Since it can replace the wireless charging module of a vehicle, it enables reducing the BOM cost of the vehicle. Furthermore, it may provide an ecosystem which integrates applications such as vehicle access, office/building access, payment and Qi-based charging into one form factor.

The smart power digital key fob may manage Car Connectivity Consortium (CCC) digital key (DK) car access as well Qi-based wireless charging applications. Thus, it may replace a complex wireless charging module plus NFC unit, and therefore reduce the BOM cost of the secure access module, while being usable as a key fob. When mounted into the car, it may also act as an additional anchor for CCC DK handsfree access using its built-in UWB and BLE transceivers (and therefore replace one static middle anchor required for CCC DK handsfree access with a cell phone). Furthermore, the secure element which is integrated into the smart power digital key fob may securely run a CCC DK and a Qi 1.3 authentication applet. In addition, the secure element may enable payment and smart home access with dedicated EMVCo or smart home applets.

More specifically, the smart power digital key fob may comprise a common criteria (CC)-certified secure element with a passive NFC interface, which houses different applets such as a CCC digital key fob applet, a Qi 1.3 applet, and a further proprietary authentication applet to store access cards and house keys. With an EMVCo certification, payment applications may also be installed on the secure element. The NFC interface may be used for car access application as well as charging the key fob. A BLE communication unit comprised in the smart power digital key fob may be used for communication and also for managing the secure element and UWB communication unit as a host controller. Furthermore, a UWB communication unit comprised in the smart power digital key fob may be used for establishing secure ranging sessions.

Accordingly, an all-in-one smart key fob may be realized, which can act, among others, as a power transmitter/receiver to support a Qi-based charging protocol. In a power receiver (PRx) mode, an external wireless charging module may be used to charge the all-in-one smart key fob. In a power transmitter (PTx) mode, the key fob may be used as a portable wireless charger for Qi-compatible electronic devices such as smart watches, wireless earbuds and smart phones. The secure element included in the all-in-one smart key fob may be provisioned with signed certificates from the Wireless Power Consortium (WPC) and, since it may be a CC certified EAL 4+ device, it may even support high power charging (15 W) according to the WPC Qi 1.3 authentication requirements. To realize a higher surface area, the key fob may be connected to an external antenna interface, specifically through the wired interface. This may significantly reduce the BOM cost of the smart access module in the central console of the vehicle.

The secure element may be provisioned in a secure trusted environment with a CCC DK Release 3 compatible digital key fob applet that allows the owner to also use the key fob for smart access, in addition to the smart phone. In some use cases, such as valet parking, sharing a digital key via a mobile device might be difficult, but sharing the key fob may be a feasible alternative. When mounted into a vehicle (e.g., in a middle console), it may not only be used as a power transmitter for WPC, but it may also act as an anchor which is used to improve the BLE communication, UWB communication or ranging performance of the handsfree vehicle access system. The smart key fob may be used for a faster end-to-end time, but also the authentication may be executed in the secure element of the key fob. In particular, no data need to be transferred to a secure element in a microcontroller of the vehicle.

The combination of an all-in-one smart key fob and an antenna may replace an entire wireless charging module in a vehicle. More specifically, a user may connect the all-in-one smart key fob into a dedicated socket which is connected to the wireless interface (i.e., the antenna) via USB-C. This allows it to act as a power transmitter and also to provide a proof to the external mobile device that it is capable of supporting high power charging. Furthermore, the private key of certificates may be stored in the secure element, which is the most secure IC of the all-in-one smart key fob. The all-in-one smart key fob may be paired to the wireless interface on its first usage. It is noted that if the interface supports dual antennas, then the all-in-one smart key fob could also be used to charge two mobile devices (e.g., smart phones) simultaneously.

In case a CCC DK handsfree function is supported by a mobile phone, the smart power digital key fob may be mounted permanently into a vehicle, in the sense that it is only used as a portable key fob in backup scenarios (e.g., when the vehicle is shared with someone who doesn't have a CCC-enabled phone). In the scenario where it is mounted into a vehicle, the smart power digital key fob may work as a WPC-compliant power transmitter to charge the phone with up to 15 W and additionally as a BLE/UWB/SE-combo anchor. Furthermore, the smart power digital key fob may be connected via BLE/UWB/NFC to the vehicle network. This may help to improve the user experience in the CCC DK Phase 3 use case, as normally three or more indoor smart access anchors are needed. Finally, in a backup scenario (i.e., a scenario in which the fob is used as a portable key fob), it may simply be charged via USB or by an external WPC-compliant power transmitter.

It is noted that the embodiments above have been described with reference to different subject-matters. In particular, some embodiments may have been described with reference to method-type claims whereas other embodiments may have been described with reference to apparatus-type claims. However, a person skilled in the art will gather from the above that, unless otherwise indicated, in addition to any combination of features belonging to one type of subject-matter also any combination of features relating to different subject-matters, in particular a combination of features of the method-type claims and features of the apparatus-type claims, is considered to be disclosed with this document.

Furthermore, it is noted that the drawings are schematic. In different drawings, similar or identical elements are provided with the same reference signs. Furthermore, it is noted that in an effort to provide a concise description of the illustrative embodiments, implementation details which fall into the customary practice of the skilled person may not have been described. It should be appreciated that in the development of any such implementation, as in any engineering or design project, numerous implementation-specific decisions must be made in order to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill.

Finally, it is noted that the skilled person will be able to design many alternative embodiments without departing from the scope of the appended claims. In the claims, any reference sign placed between parentheses shall not be construed as limiting the claim. The word "comprise(s)" or "comprising" does not exclude the presence of elements or steps other than those listed in a claim. The word "a" or "an" preceding an element does not exclude the presence of a plurality of such elements. Measures recited in the claims may be implemented by means of hardware comprising several distinct elements and/or by means of a suitably programmed processor. In a device claim enumerating several means, several of these means may be embodied by one and the same item of hardware. The mere fact that certain measures are recited in mutually different dependent claims does not indicate that a combination of these measures cannot be used to advantage.

LIST OF REFERENCE SIGNS

100 vehicle access system
102 Middle Console-Anchor
104 BLE communication unit
106 UWB communication unit
108 NFC reader
110 power transmitter
112 smart fob
114 NFC PICC/SE
116 power receiver
118 BLE communication unit
120 UWB communication unit
122 power management unit
200 key fob
202 wireless interface
204 wired interface
300 method of configuring a key fob
302 providing a key fob with a wireless interface for establishing a wireless connection to a controller integrated in a vehicle, wherein the wireless connection enables the key fob to provide access credentials to said controller
304 providing the key fob with a wired interface for connecting the key fob to a console integrated in the vehicle, such that the key fob is usable for carrying out wireless charging of an external mobile device and/or for acting as an anchor device for performing ranging operations with said external mobile device
400 vehicle access system
402 Middle Console-Anchor
404 wired interface
406 smart power digital key fob
408 wired interface
410 NFC PCD-PICC/SE
412 power transmitter/receiver
414 BLE communication unit
416 UWB communication unit
418 power management unit

The invention claimed is:

1. An electronic device, comprising:

a wireless interface for establishing a wireless connection to a controller integrated in a vehicle, wherein the wireless connection enables the electronic device to provide access credentials to the controller; and a wired interface for connecting the electronic device to a console integrated in the vehicle, such that the electronic device is configured to wirelessly charge an external mobile device using power delivered to the electronic device via the wired interface, wherein the electronic device forms part of a key fob.

2. The electronic device of claim 1, further comprising a power transmitter configured to be connected, through the wired interface, to one or more antennas integrated in the vehicle, and to carry out the wireless charging through the antennas.

3. The electronic device of claim 1, further comprising a power receiver configured to receive power from an external charging device and to transfer the power to one or more components of the electronic device.

4. The electronic device of claim 1, further comprising a near field communication (NFC) unit, wherein the NFC unit is configured to act as a proximity coupling device for establishing an NFC channel with the mobile device.

5. The electronic device of claim 4, wherein the NFC unit further comprises a secure element configured to store an electronic device applet, a wireless charging applet, an authentication applet, or a payment applet.

6. The electronic device of claim 1, wherein the electronic device is further configured to act as an anchor device for performing ranging operations with the external mobile device.

7. The electronic device of claim 6, further comprising an ultra-wideband, UWB, communication unit for performing the ranging operations with the mobile device.

8. The electronic device of claim 1, wherein the wireless interface is a Bluetooth low energy (BLE) communication unit.

9. A method of configuring an electronic device, comprising:

providing the electronic device with a wireless interface for establishing a wireless connection to a controller integrated in a vehicle, wherein the wireless connection enables the electronic device to provide access credentials to the controller;

providing the electronic device with a wired interface for connecting the electronic device to a console integrated in the vehicle, such that the electronic device is usable for carrying out wireless charging of an external mobile device or for acting as an anchor device for performing ranging operations with the external mobile device; and incorporating the electronic device in a key fob.

10. The method of claim 9, further comprising providing the electronic device with a power transmitter configured to be connected, through the wired interface, to one or more antennas integrated in the vehicle, and to carry out the wireless charging through the antennas.

11. The method of claim 9, further comprising providing the electronic device with a power receiver configured to receive power from an external charging device and to transfer the power to one or more components of the electronic device.

12. The method of claim 9, further comprising providing the electronic device with a near field communication (NFC) unit, wherein the NFC unit is configured to act as a proximity coupling device for establishing an NFC channel with the mobile device.

13. The method of claim 12, wherein the NFC unit further comprises a secure element for storing an electronic device applet, a wireless charging applet, an authentication applet, or a payment applet.

14. The method of claim 9, further comprising providing the electronic device with an ultra-wideband (UWB) communication unit for performing the ranging operations with the mobile device.

* * * * *